April 22, 1969    S. H. QUANBECK    3,439,819
DEVICE FOR FILLING GRAIN DRILLS AND THE LIKE
Filed Sept. 12, 1966
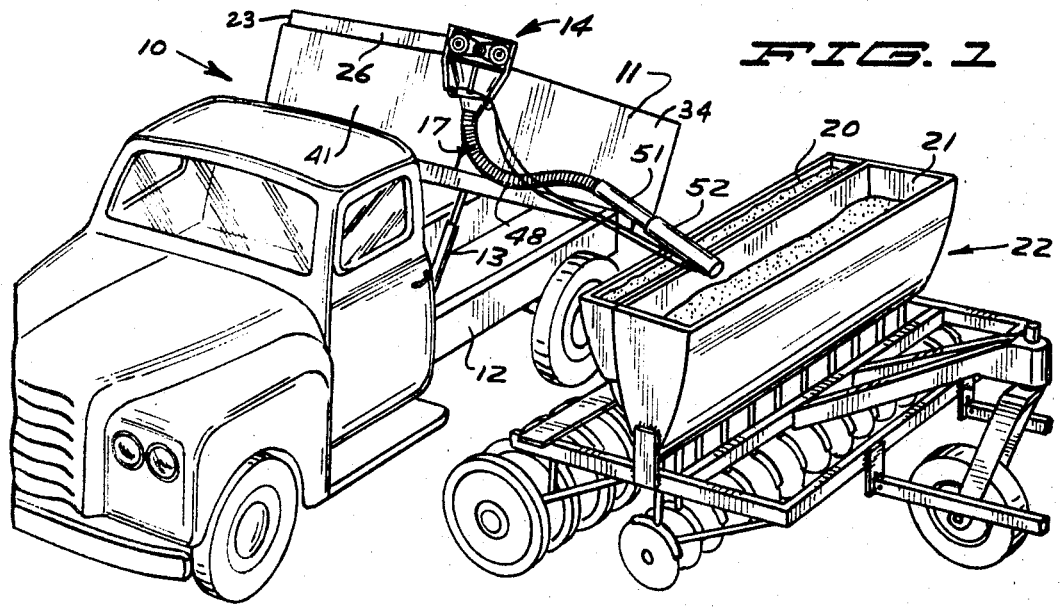
FIG. 1
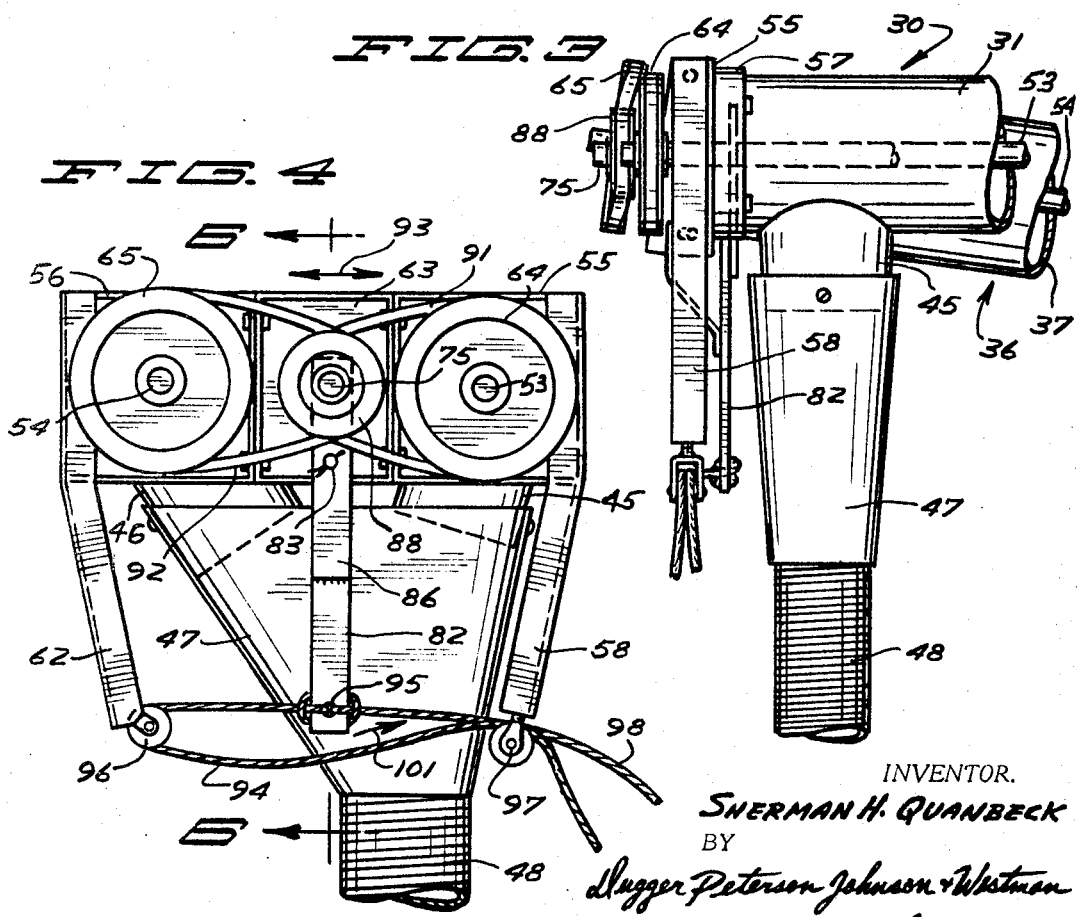
FIG. 3
FIG. 4
INVENTOR.
SHERMAN H. QUANBECK
BY
Dugger Peterson Johnson + Westman
ATTORNEYS

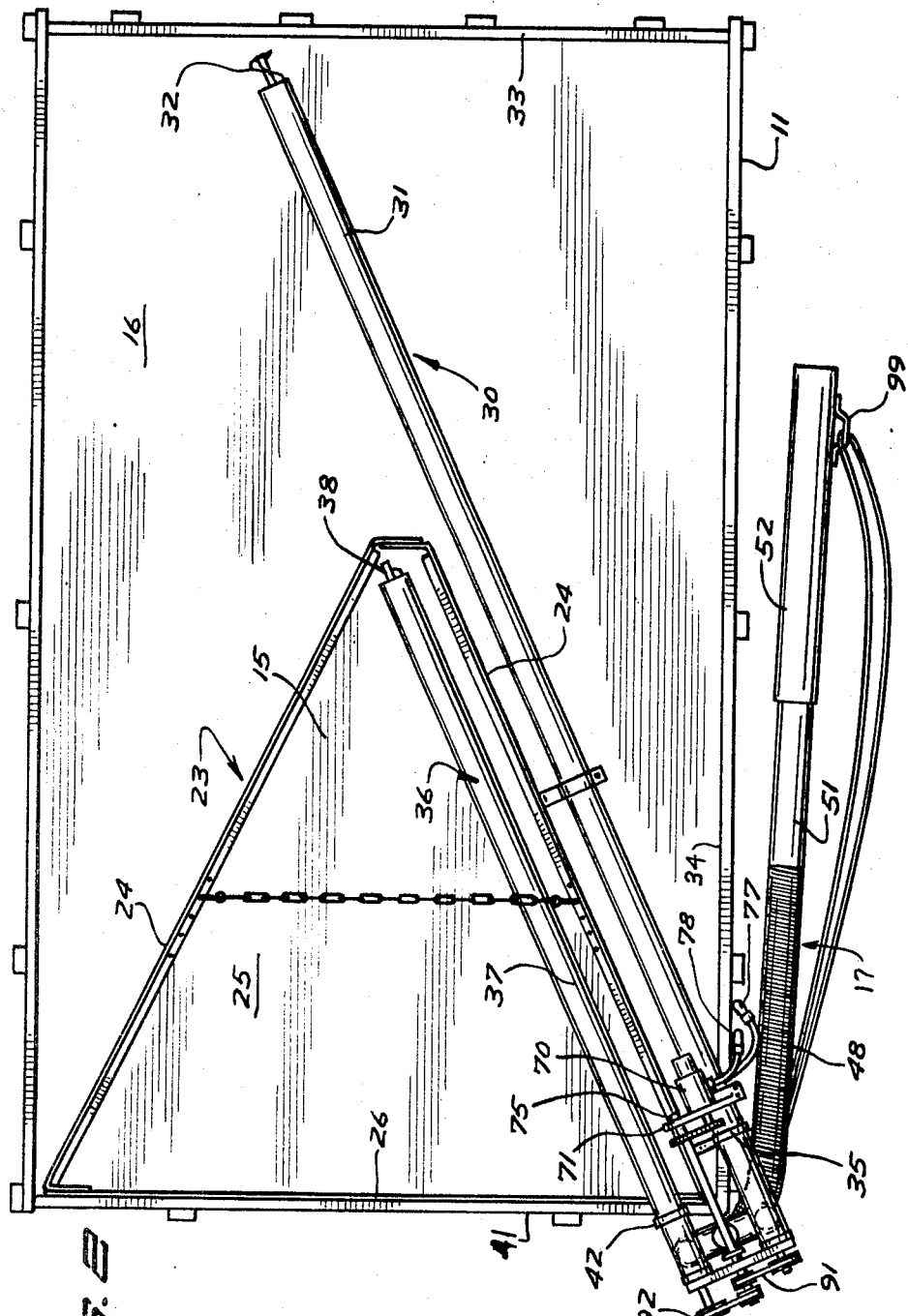

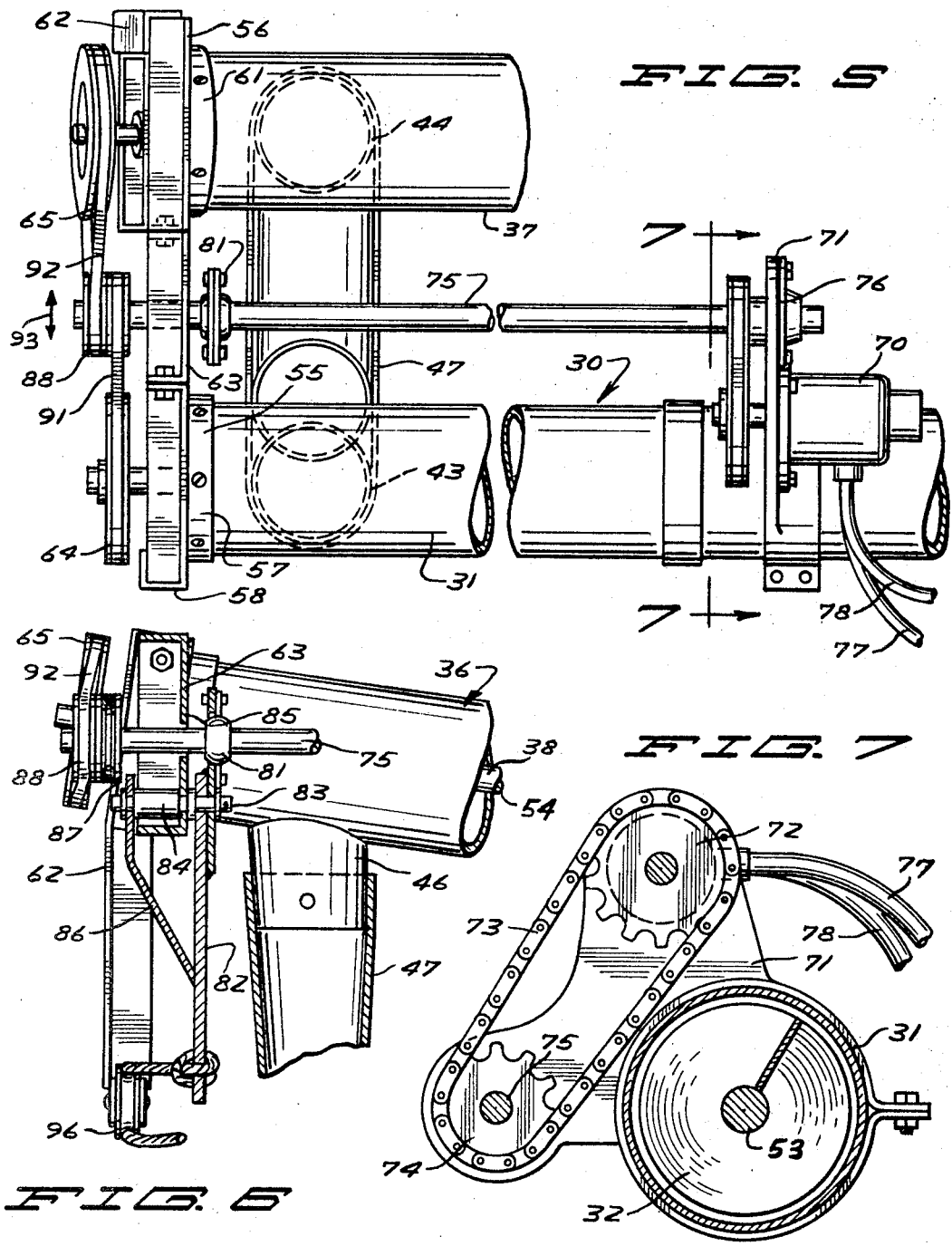

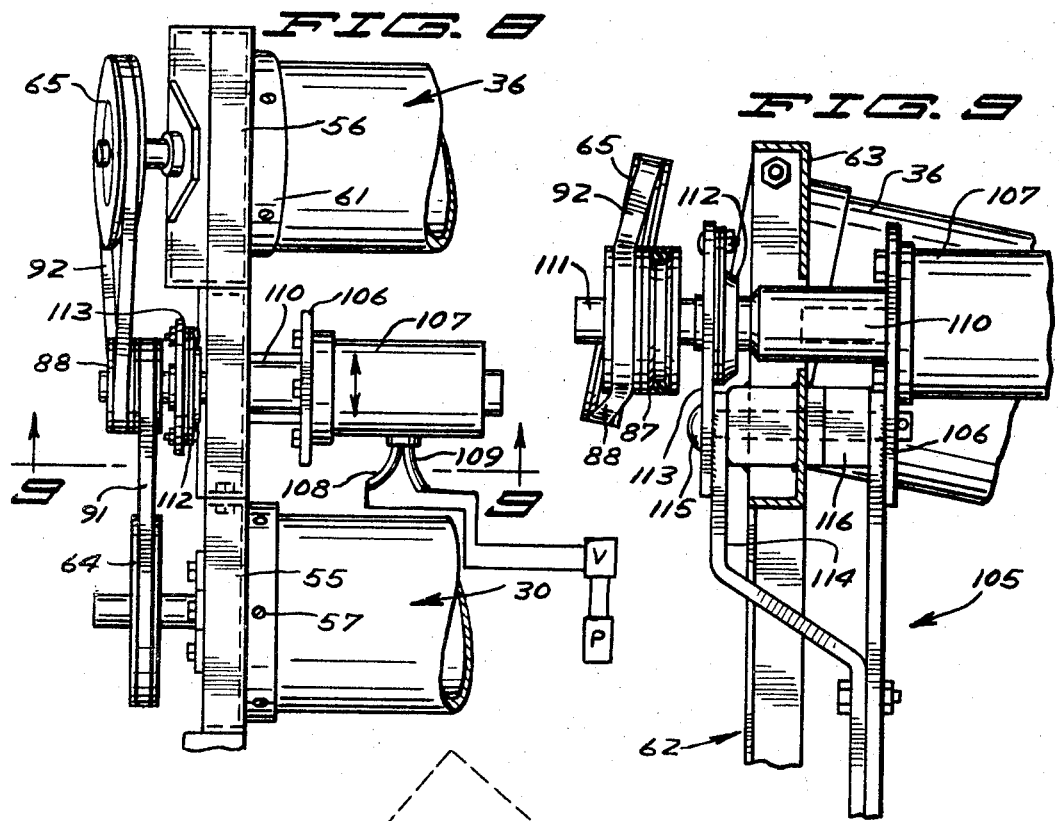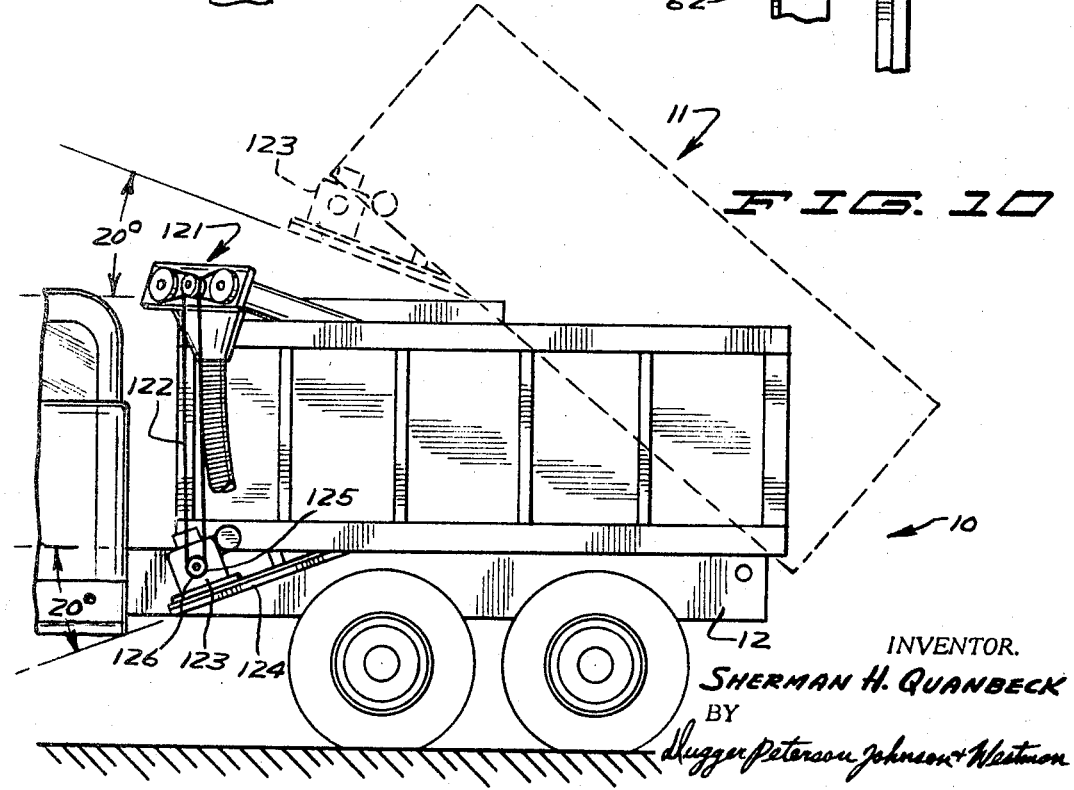

United States Patent Office 3,439,819
Patented Apr. 22, 1969

3,439,819
DEVICE FOR FILLING GRAIN DRILLS AND THE LIKE
Sherman H. Quanbeck, Aneta, N. Dak. 58212
Filed Sept. 12, 1966, Ser. No. 578,843
Int. Cl. B60p 1/04
U.S. Cl. 214—508                                   22 Claims

ABSTRACT OF THE DISCLOSURE

A compartmented box for use in storing and handling two different items, such as seed grain and fertilizer, and particularly adapted for use in portable boxes including a pair of conveyors, one to each of the compartments, having a common discharge collecter housing located outside of both of the compartments. The conveyors are powered and power is controlled through a single control which can be used to alternately power either of the conveyors to discharge the material from either of the compartments into the collector housing and then through a suitable flexible spout into the area in which the material is to be deposited. In particular, the unit finds use for filling grain drills wherein seed must be placed in one compartment and inorganic fertilizer in the other.

---

This invention has relation to a device for the use in filling two separate compartments adjacent separate mobile storage compartments with a minimum of effort and alternately using one distribution chute for the products from both of the storage compartments.

At the present time, the art of farming is highly mechanized. One of the few tasks that remains largely manual is the transfer of seed grain and fertilizer into the boxes of the large field grain drills used. When both fertilizer and seed are used, the filling job of the drill and the fertilizer attachment becomes hard work.

The device of the present invention presents a simple, economical and highly efficient device for dispensing inorganic fertilizer or seed grain interchangeably. The fertilizer and the seed grain are stored in separate compartments within a truck box, and separate augers are provided for each. The augers each dispense material into a common discharge chute which can be manually moved along the length of the grain drill in order to insure an even fill throughout the box of the drill. The augers are controlled alternately to remove material from their respective compartments, and the flow of material is under the force of gravity from the discharge end of the augers through the discharge chute and into the respective boxes on the drill.

It is therefore an object of the present invention to present a system for filling both the grain drill box and the fertilizer attachment box on a farm grain drill using a single discharge spout and controls for dispensing either fertilizer or seed grain.

It is another object of the present invention to present a control for operating two augers alternately from a common drive shaft through the use of the V-belt drives in a simple, economical way.

It is another object of the present invention to present a drill fill system which can be used for dispensing either fertilizer or seed grains with a common discharge spout, and which will fit conveniently into the box of a standard farm truck.

It is another object to present unique drives for the augers.

Other objects are inherent in the specification and will become apparent as the description proceeds.

In the drawings,

FIG. 1 is a perspective view of a truck box having an auger drill fill system made according to the present invention installed thereon and shown adjacent a schematically illustrated grain drill with a fertilizer attachment;

FIG. 2 is a top plan view of a truck box having apparatus made according to the present invention positioned therein;

FIG. 3 is an enlarged side elevational view of the discharge end of the augers of FIG. 2;

FIG. 4 is a front elevational view of the discharge end of the augers of FIG. 2;

FIG. 5 is a fragmentary enlarged top plan view of the discharge end of the augers of FIG. 2 showing the drive details;

FIG. 6 is a sectional view taken as on line 6—6 of FIG. 4;

FIG. 7 is a sectional view taken as on line 7—7 of FIG. 5;

FIG. 8 is a top view of the auger assembly taken substantially in the same position as FIG. 5 showing a modified drive used with the present invention;

FIG. 9 is a sectional view taken as on line 9—9 in FIG. 8; and

FIG. 10 is a side elevational view of the truck showing a gasoline engine installed for driving the unloading device of the present invention.

Referring to the drawings and the numerals of reference thereon, a truck illustrated generally and schematically at 10 is provided with a box 11 which is mounted onto the truck frame 12 so that it can be raised upwardly as shown in FIG. 1 through the use of a conventional hydraulic hoist 13. The hoist is powered from the truck through conventional controls.

The truck box 11 is provided with an unloading device illustrated generally at 14. The unloading device is shown in greater detail in FIGS. 2–7. The device is made so that it will empty fertilizer from a first truck box compartment 15 or seed grain from a second truck box compartment 16 into a discharge spout 17. Material in the discharge spout 17 will flow under gravity and the end of the spout can be manually manipulated to deposit material either into a fertilizer hopper 20 or a grain hopper 21 both of which are provided on a grain drill shown schematically at 22. The grain drill is shown with the covers or lids for both the fertilizer hopper and the seed hopper removed.

As material is discharged into the spout 17, the end of the spout can be moved along the hoppers so that the hoppers for the fertilizer or the grain are filled evenly throughout their lengths.

Referring to FIG. 2, it can be seen that the first compartment 15 in the truck box 11 is comprised as a separately formed tank 23 having side walls 24 in V form and has a bottom 25 and front wall 26. The tank is fastened to the box of the truck in any convenient manner using suitable brackets or bolts. The rear portions of the two walls 24 are held together in any suitable manner.

The compartment 16 comprises the rest of the truck box and includes the rear portion. It should be noted that the first compartment 15 made by tank 23 is positioned with the narrow end of the V closest to the rear of the truck box. When the truck box is raised as shown in FIG. 1, the rear portion of tank 23 is thus lower than the front portion and fertilizer in the compartment 15 will flow toward the rear of the walls 24.

The unloading device illustrated generally at 14 includes a first auger assembly 30 which includes an outer tube 31 and a rotatably mounted helical auger 32 within the tube. The auger 32 extends outwardly beyond the tube at the feed or input end, and this end of the auger is positioned adjacent the rear wall 33 of the truck box. The first auger assembly 30 is positioned within the second compartment 16. The first long auger 30 extends up over a side wall 34 of the box adjacent the front part thereof and is held in place with one or more clamps 35 which are attached around the tube 31 and bolted to the wall of the tank 23. These clamps 35 can be mounted in any suitable manner.

A second auger assembly 36 which is shorter than the auger assembly 31 is positioned substantially parallel to the first auger assembly and includes an outer tube 37 with an inner screw conveyor or auger 38 inside the tube. The second auger assembly 36 is positioned with the feed end inside the tank 23 and adjacent the back portions of the tank. The rear of the auger rests on the bottom 25 of the tank. The auger extends forwardly and upwardly over a front wall 41 of the truck box and is held in place with a suitable clamp 42 that is passed around the tube 37 and clamped to tank 23. As shown the tank is higher than the side walls of the truck box. The front wall 26 is notched out for auger 36 so that the top of auger 36 is below the top edge of the tank. This makes it possible to place a tarpaulin over the fertilizer tank 23 easily. The tarp fits tightly over the tank without interference from the augers. Auger 30 is positioned alongside the tank. The augers 30 and 36 are thus held close together and their discharge ends extend out beyond the box at one front corner thereof.

The discharge ends shown in FIGS. 3-7 in detail. Each of the auger tubes 31 and 37 have a provided opening shown in dotted lines in FIG. 5. These openings are numbered 43, 44 respectively. The openings are surrounded by short spouts or pipes 45 and 46, respectively. The pipes in turn are open into a collector or accumulator housing 47 that is attached to the pipes in any suitable manner (as shown sheet metal screws) and extends downwardly therefrom on the outside of the truck box.

The accumulator housing 47 has tapered side walls that terminate at and define a substantially circular opening to which a flexible conduit 48 of large diameter is attached. This flexible conduit is of substantial length, as shown in FIG. 2, and in turn is connected to a tube 51. The tube 51 has a telescoping extension tube 52 fitted thereover. Suitable means are provided on the tubes 51 and 52 to prevent them from separating in longitudinal direction and yet will permit the extension tube 52 to telescope and thereby shorten the effective length of the spout assembly 17.

Material being dropped from the augers into the collector housing or accumulator 47 will flow from gravity into the flexible tube or conduit 48 and thus into the tube 51 and extension 52. By directing the end of extension tube 52 to the desired part of the drill hoppers, the hoppers 20 or 21 can be filled.

Each of the auger assemblies includes a helical or screw conveyor member. These members have center shafts 53 and 54, respectively, which extend outwardly through an end plate assembly mounted onto the auger tubes. The end plate assemblies are illustrated at 55 and 56 for the respective tubes. The assembly 55 includes a collar 57 that is attached to the end of the tube 31 and has a frame surrounding and closing the end of the tube. The end plate assembly 55 includes a downwardly depending leg 58 as shown in FIG. 4.

The end plate assembly 56 has a collar 61 that fits over tube 37 and is fastened thereto and also has a downwardly depending leg 62 that is aligned with the leg 58 and spaced from it on the opposite side of the unit. The two end plate assemblies 55 and 56 are bolted to a center section 63 along provided flanges. This permits the use of the augers individually at separate locations at different times and the drive mechanism can be left with one of the augers.

A V-belt sheave 64 is drivably mounted onto the shaft 53 on the outside of the end plate assembly 55. A V-belt sheave 65 is mounted onto the outer end of the shaft 54 of the auger assembly 36.

In order to drive the screw conveyors within the auger tubes, as shown, a hydraulic motor 70 is mounted onto a support plate 71 which in turn is clamped onto the tube 31 in a conventional manner. The hydraulic motor has a drive sprocket 72 that drives a chain 73 which in turn drives another sprocket 74 that is drivably mounted onto a shaft 75 that is positioned between the two auger assemblies. The shaft 75 is mounted to the bracket 71 through a self-aligning bearing 76. The self-aligning bearing 76 has a spherical outer race that can take some movement of the shaft without causing damage to the bearing.

The hydraulic motor 70 is driven through conduits 77 and 78 from a suitable source of hydraulic pressure. A pump driven by the truck power take off is normally used. The auger end of the shaft 75 is also mounted in a self-aligning bearing 81 that in turn is attached to an arm 82. The arm 82 is mounted onto a pin 83 that is rotatably mounted in a housing 84. The housing 84 is attached to a plate 85 forming part of the end plate center section 63. An extension of the arm 82 extends downwardly below the end plate assemblies. As shown, a brace member 86 is also attached to the arm 82 and is passed over and mounted on the pin 83 at the front of the housing 84 to give stabilty to the bearing 81. The plate 85 is slotted to permit the shaft 75 to move from side to side as the arm 82 pivots about the axis of the pin 83.

At the outer end of the shaft 75 a pair of V-belt sheaves 87 and 88, respectively, are drivably mounted. The sheave 87 aligns with the sheave 64, and the sheave 88 is used to drive the sheave 65. It can be noted in FIG. 6 in particular that the sheave 65 is positioned at an angle with respect to the plane of the sheave 88. This is because of the difference in angle of inclination between the two auger assemblies. The difference itself is not great enough to cause the belts between the sheaves to jump off so that the sheave 88 does drive the sheave 65. As shown, belts 91 and 92, respectively, are used for this drive. It can be seen that upon pivoting the arm 82 about the axis of the pin 83, the sheaves 87 and 88 will be moved in direction as indicated by the double arrow 93. When this happens, one of the belts 91 or 92 will tighten and the other will loosen. Upon tightening of one belt, of course, the corresponding sheave will be driven, causing the connected auger to rotate and convey material. In order to actuate the arm 82, a control rope 94 is utilized. As shown, the rope is attached to the lower end of the arm 82 as at 95. The rope passes over a pulley 96 attached to the leg 62 of the end plate on auger assembly 36 and then this rope passes through another pulley 97 on the arm 58.

A second rope 98 is attached to the end of the arm 82 as at 95 as well and passes through a guide at the lower end of leg 58. Then both the ropes 94 and 98 are extended downwardly to the outer end of the feed spout assembly and are attached to a handle 99 that is provided at the outer end of the extension tube 52. It can be seen then that an operator upon pulling either the rope 94 or 98 can cause one or the other of the augers to be driven. For example, if the rope 98 is pulled, the arm 82 will move in direction as indicated by arrow 101 causing the sheaves to move in opposite direction and tighten the belt 91 between the sheave 64 and the sheave 87. This will drive the screw conveyor 32 inside tube 31 and cause grain from compartment 16 to be conveyed upwardly over the side of the truck box, dropped into the accumulator or collector, and under the force of gravity drop through the flexible tube 48, tube 51 and out through the extension tube 52. The operator can then move the end of the extension tube 52 along the hopper 21 for the grain drill to fill the hopper evenly. By causing the extension tube 52 to slide up onto the tube 51, the differences in length necasary to move the tube along the drill can be easily accommodated to obtain even filling along the length of the grain drill. Upon release of the rope 98, the sheaves 87 and 88 will tend to return to position where they are not driving either belt and merely rotating freely. Thus all of the grain that is in the accumulator and tube can be emptied out into the hopper 21 before the other auger is started.

If fertilizer is to be dispensed, the rope 94 will be pulled moving the arm 82 in direction opposite from that indicated by arrow 101. This will cause the belt 92 to be tightened and sheave 88 to drive the sheave 65 thus rotating the screw conveyor 38 inside the tube 37 and conveying fertilizer through the auger assembly into the accumulator housing 47, and into the distribution tube. The operator will then dispense the fertilizer into the fertilizer hopper 20.

Of course, it is assumed that the hydraulic motor 70 will be started and will be driving the shaft 75 prior to this operation.

By raising the truck box as shown in FIG. 1, all of the material or substantially all of the material in the two compartments can be dispensed before they have to be refilled. The fertilizer will slide back toward the closed end of the V formed by walls 24 and be fed from the auger assembly very efficiently. The grain of course will slide toward the rear wall 33 of the truck and be picked up by the auger 32.

In most trucks at the present time, power take offs are provided for hydraulic pumps and this is a source of power readily available. Suitable control valves would be used for controlling the hydraulic motor in the known manner.

The arm 82 and the two sheaves 87 and 88 act as a clutch to provide a neutral position where neither of the augers is driven or an alternate drive for one or the other of the augers merely by pulling on a rope. This is a very low cost clutch and drive set up making the operation simple, efficient, and well within the reach of the average farmer. Self-aligning bearings permit the shaft 75 to be swung slightly to permit this tightening of alternate belts without damaging the shaft or the bearings. Because of a very small movement adjacent the rear bearing 76 on the shaft 75, the action on sprocket 74 and chain 73 is slight. Suitable slack can be provided in this chain to accommodate any tightening or loosening of this sprocket during movement of the shaft.

Referring to FIGURES 8 and 9, a modified form of the invention is illustrated. The modification deals with the mounting of the power drive shaft for the augers. The augers are mounted as before and are positioned in the truck box in the same manner. The auger assemblies 30 and 36 are mounted onto the end plates in the same manner as before. However, the swinging arm assembly is changed. As shown, the swinging arm assembly 105 has a plate 106 attached thereto on which a hydraulic motor 107 is directly bolted. The hydraulic motor 107 is controlled by directing fluid under pressure either through conduit 108 or conduit 109 in order to effect rotation.

The hydraulic motor 107 has an output shaft shown in dotted lines in FIG. 9 and a hub 110 is drivably mounted over this output shaft. The hub 110 has a shaft 111 extending outwardly therefrom. The shaft 111 is mounted in a bearing 112 that is of the self-aligning type and this bearing in turn is mounted onto a bracket 113 that is bolted to an offset bracket 114 of the swinging arm assembly. The arm assembly itself pivots about the axis of a pin 115 mounted through a suitable support sleeve 116 that is attached to the center section 63 of the end plates.

The sheaves 87 and 88 are drivably mounted onto the outer end of the shaft 111 and drive through the V-belts to the sheaves 64 and 65, respectively. The swinging arm operates in the same manner as before, and by moving it, one of the belts can be tightened while the other is loosened. The rope control operates on the end of the swinging arm assembly. The use of a hydraulic motor mounted directly on the swinging arm as shown simplifies the drive, and eliminates a good deal of mechanism.

A device for mounting a gasoline engine for driving the shaft 75 is shown partially schematically in FIGURE 10. Common four cycle gasoline engines will not operate at a high angle such as that incurred when a truck box is raised to position as shown in dotted lines in FIGURE 10. In fact, the maximum operating angle of the motors is approximately 20°, while the truck box floor itself will move to an angle to about 40° from the horizontal. As shown, the unloading device 14 is mounted in the truck in the same manner as before, but a gasoline engine 123 is mounted onto a support member 124 so that the plane of the base of the engine extends at an angle of approximately 20° downwardly from the horizontal. The output shaft 125 of the engine has a sheave 126 thereon which in turn drives the belt 127 that extends upwardly and drives the suitable sheave drivably mounted onto a shaft 75, or a similar shaft mounted between the augers. When the truck box is raised to its full up position, so that the floor of the box is approximately 40° from the horizontal, the plane of the normal base gasoline engine 123 will only be inclined from the horizontal 20° upwardly. Thus the gasoline engine will operate in both positions of the truck box and any place inbetween and this will make the unloading device operable. The plane of the base declines about one-half of the angle of the truck box floor with respect to the horizontal when the box is in its raised position.

The clutch action of the double sheaves on the pivoting arm reduces costs, simplifies operation and really makes the device a labor saver for the farmer. Two products can be interchangeably dispensed. Not only seed and fertilizer, but two kinds of cattle feed can be dispensed. A concentrate or supplement and regular ground grain, for example, or two different rations can be placed in one truck and fed to two different pens of animals.

What is claimed is:

1. An unloading device for a storage box or the like comprising a pair of auger unloaders positioned in side by side relationship and spaced apart, a drive shaft positioned between said auger unloaders, power means to drive said drive shaft, first means to mount said drive shaft for movement toward and away from the respective augers, first and second drive pulleys on said drive shaft, a separate driven pulley on each of said augers, belt means between said first drive pulley and a first of said driven pulleys and belt means between said second pulley and a second of said driven pulleys, said drive shaft being positioned so that when the shaft is moved by said first means in direction toward and away from the augers, each of the belt means alternately loosens and tightens in opposite phase from the other belt means.

2. The combination as specified in claim 1 wherein said first means for moving said drive shaft toward and away from said augers is remotely manually operable.

3. The combination specified in claim 1 wherein said storage box is divided into two compartments, and one of said augers is in each compartment.

4. The combination as specified in claim 1 wherein said first means includes an arm mounting said drive shaft, means to pivotally mount said arm with respect to said augers, and means to move a portion of said arm on a side of said pivot opposite from said drive shaft in back and forth directions.

5. The combination as specified in claim 1 and discharge means on said augers outside the storage box and wherein said augers, when powered, will each discharge material from the storage box into a common collector housing, and flexible spout means leading from said collector housing at the bottom portions thereof to permit material to flow under force of gravity from said housing.

6. An unloading device for truck boxes and the like, said box having at least two compartments therein, said unloading device comprising conveyor means in each of said compartments extending outwardly over the side of said truck box in adjacent relationship where they do extend over the side, each of said conveyor means having a separate conveyor drive shaft, said drive shafts being spaced apart, a power shaft mounted for movement between said conveyor drive shafts, power means to drive said power shaft, first drive belt means between said power shaft and a first conveyor drive shaft and second belt means between said power shaft and a second conveyor drive shaft, and means to move said power shaft in a path so that when said first belt means is tightened to drive said first conveyor shaft said second belt means loosens and slips and when said power shaft is moved to tighten said second belt means, the said first belt means slips.

7. The combination as specified in claim 6 wherein said conveyors are comprised as auger type conveyors.

8. The combination as specified in claim 6 wherein said truck box is divided into compartments by a separate removable tank, said auger type conveyors being mounted onto said tank and being positioned so that the discharge end thereof extends over a forward corner of said truck box and said tank.

9. The combination as specified in claim 6 wherein said conveyors discharge into a common collector housing, and flexible spout means leading from said housing in direction so that material in said housing will flow through said spout means under gravity.

10. The combination as specified in claim 6 and an arm mounted with respect to said conveyors, said power shaft being mounted on said arm, and means to manually move said arm in opposite directions to cause said power shaft to be moved.

11. The combination as specified in claim 10 wherein said arm can be controlled from the outer end of said chute means.

12. The combination as specified in claim 6 wherein said power means is comprised as a hydraulic motor and said motor is mounted directly onto said pivoting arm.

13. The combination as specified in claim 6 wherein said power means is comprised as a gasoline engine.

14. The combination as specified in claim 13 wherein said truck box is movable about a pivot from an up position to a normal down position wherein a truck box floor is substantially horizontal, and said gasoline engine is mounted so that the plane of normal support base thereof declines downwardly from the horizontal at an angle substantially one-half of the angle of the truck box floor with respect to the horizontal when said box is in its raised position.

15. An unloading device for a truck box or the like having a floor and peripheral walls, means defining at least two separated compartments in said box, said unloading device comprising separate conveyor means in each of said compartments, said separate conveyor means each extending outwardly over the walls of said truck box in adjacent relationship and positioned substantially above the floor of the box where they pass over the walls, a collector housing positioned to the outside of the periphery of said truck box, means to mount said collector housing in position to receive material from each of said conveyor means, and power means to selectively drive one or the other of said conveyor means to discharge material from each of said compartments selectively into said collector housing.

16. An unloading device for a truck box or the like having a floor and peripheral walls, means defining two separated compartments in said box, said unloading device comprising separate conveyor means in each of said compartments, said conveyor means extending outwardly over the walls of said truck box in adjacent relationship, a collector housing, means to mount said collector housing in position to receive material from each of said conveyor means, said compartments in said box being formed by interior wall means mounted in said box, said wall means including at least two sections that terminate adjacent opposite sides of said box and adjacent the front of said box and extend rearwardly toward each other to form a substantially V shaped compartment, and power means to selectively drive one or the other of said conveyor means to discharge material from each of said compartments selectively into said collector housing.

17. The combination as specified in claim 16 wherein the conveyor means both extend outwardly from the box adjacent the forward end of the box, means to raise the forward portion of said box so the box floor inclines downwardly and rearwardly, and means to mount the conveyor means so that input ends of the conveyor means are at the rear portion of their respective compartments.

18. An unloading device for a truck box or the like having a floor and peripheral walls, means defining two separated compartments in said box, said unloading device comprising separate conveyor means on each of said compartments, said conveyor means extending outwardly over the walls of said truck box in adjacent relationship, a collector housing, means to mount said collector housing in position to receive material from each of said conveyor means, power means to selectively drive one or the other of said conveyor means to discharge material from each of said compartments selectively into said collector housing, said power means being mounted to a first of said conveyor means, and bracket means to hold both of said conveyor means together, said bracket means including release means to permit removal of a second of said conveyor means from the first conveyor means.

19. An unloading device for a truck box or the like having a floor and peripheral walls, means defining at least two separated compartments in said box, said unloading device comprising separate conveyor means in each of said compartments, said separate conveyor means each extending outwardly over the walls of said truck box adjacent a forward corner thereof in adjacent relationship and positioned substantially above the floor of the box where they pass over the walls, a collector housing, means to mount said collector housing in position to receive material from each of said conveyor means, said collector housing being mounted so that a substantial portion of said collector housing is positioned ahead of the front wall of the truck box, and power means to selectively drive one or the other of said conveyor means to discharge material from each of said compartments selectively into said collector housing.

20. An unloading device for a truck box or the like having a floor and peripheral walls, means defining at least two separated compartments in said box, said unloading device comprising separate conveyor means in each of said compartments, said separate conveyor means each extending outwardly over the walls of said truck box in adjacent relationship and positioned substantially above the floor of the box where they pass over the walls, a collector housing, means to mount said collector housing in position to receive material from each of said conveyor means, said collector housing comprising a walled structure having a single outlet opening defined therein, said walled structure being formed in relation to the outlet opening and the conveyor means so that material discharged into the collector housing from either conveyor means flows under gravity toward the outlet opening, and power means to selectively drive one or the other of said conveyor means to discharge material from each of said compartments selectively into said collector housing.

21. An unloading device for a truck box or the like having a floor and peripheral walls, means defining at least two separated compartments in said box, said unloading device comprising separate auger conveyor means positioned in side by side relation and spaced apart, said auger conveyor means including auger shafts, a drive shaft positioned adjacent both of said auger conveyor means, said drive shaft being substantially parallel to the axes of said auger shafts, power means to drive said drive shaft, said drive shaft means being a common source of power for said auger shafts, and clutch means between said drive shaft means and each of said auger shafts to selectively connect said drive shaft means to each of said conveyor means, each of said conveyor means extending outwardly over the walls of said truck box in adjacent relationship and positioned above the floor of the box where they pass over said walls, and gravity feed discharge means for receiving material discharged from said conveyor means, said discharge means being located outside the box walls and mounted on the conveyor means.

22. An unloading device for a truck box or the like having a floor and peripheral walls, means defining at least two separated compartments in said box comprising a removable tank having side walls and a tank floor placed within the truck box and overlying the truck box floor, said tank being smaller than the periphery of the truck box to form the two compartments, one within the tank and the other between the tank walls and the box walls, a separate conveyor means in each of said compartments, both of said separate conveyor means being attached to said tank in adjacent relationship, said conveyor means each having a discharge end portion, said discharge end portions being spaced substantially above the plane of the floor of the truck box, power means to selectively drive one or the other of the conveyor means to selectively discharge material from each of the compartments, and means to permit gravity feed of material from the discharge end portions of each of said conveyors.

References Cited

UNITED STATES PATENTS 3,123,235    3/1964    Tweedale _____ 214—17
2,960,320    11/1960    Heider.

FOREIGN PATENTS 565,938    11/1958    Canada.

GERALD M. FORLENZA, *Primary Examiner.*

FRANK E. WERNER, *Assistant Examiner.*

U.S. Cl. X.R.

214—83.32; 222—413; 74—228; 198—213